Aug. 26, 1947.　　A. M. SKELLETT　　2,426,245
TIME AND DISTANCE MEASURING SYSTEM
Filed Oct. 9, 1943　　6 Sheets-Sheet 1

INVENTOR
A. M. SKELLETT
BY Franklin Mohr
ATTORNEY

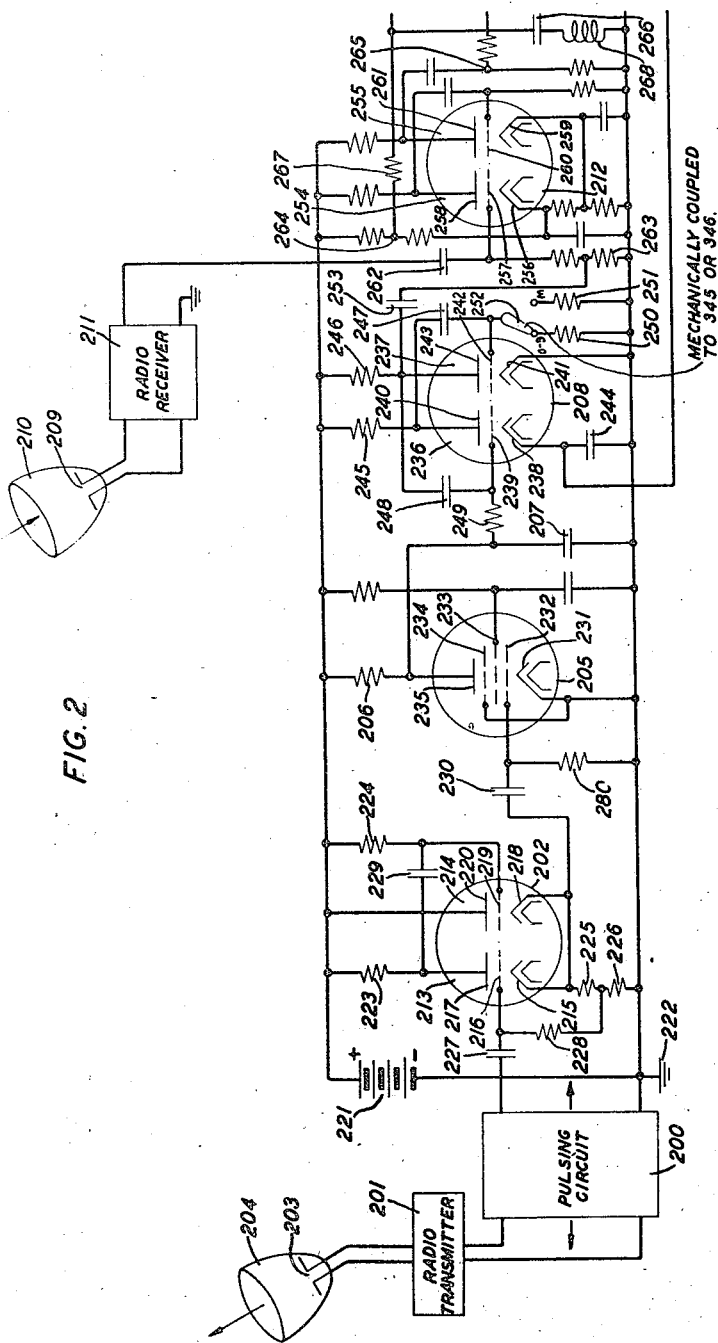

Aug. 26, 1947.  A. M. SKELLETT  2,426,245
TIME AND DISTANCE MEASURING SYSTEM
Filed Oct. 9, 1943  6 Sheets-Sheet 3

INVENTOR
*A. M. SKELLETT*
BY
*Franklin Mohr*
ATTORNEY

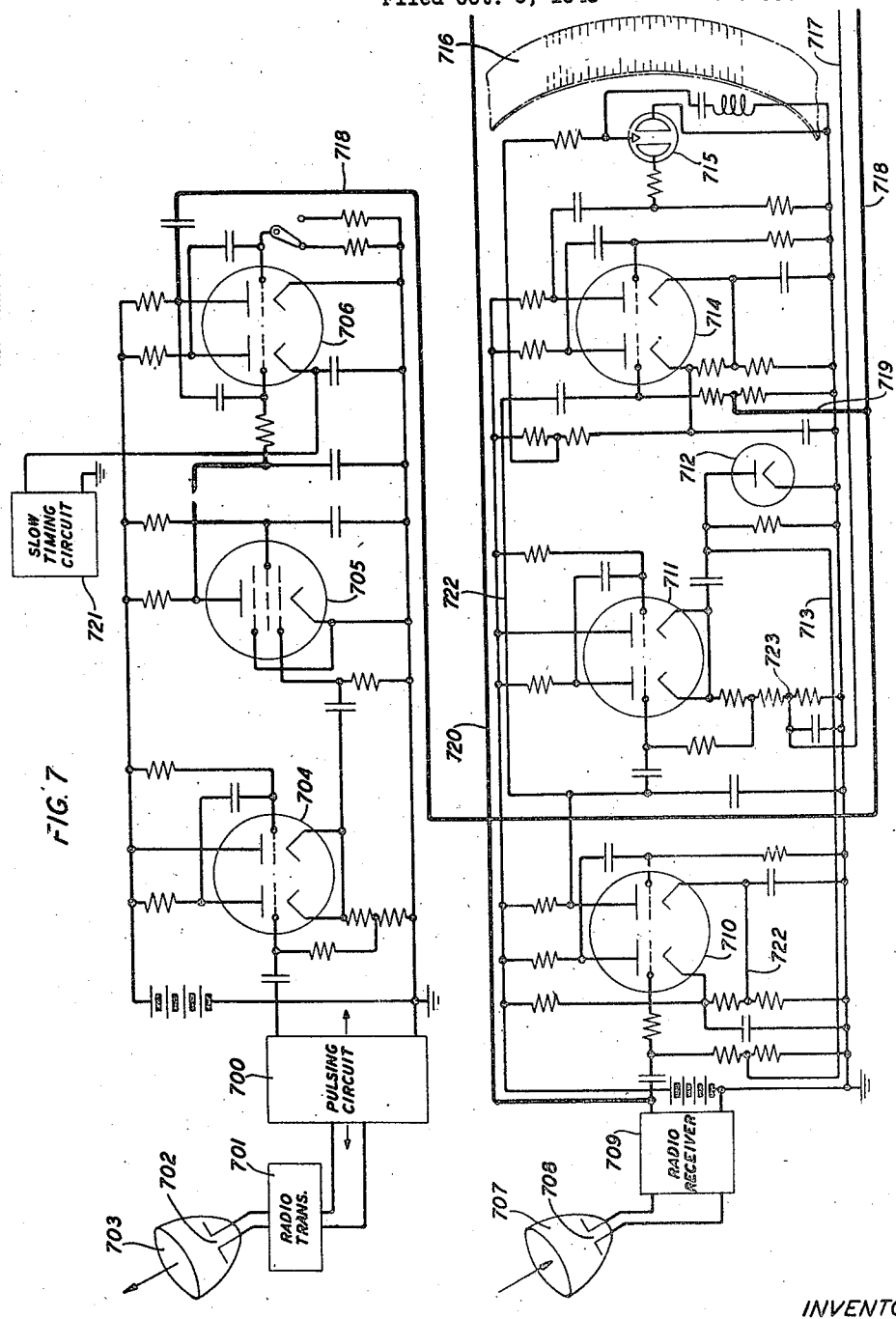

Aug. 26, 1947.  A. M. SKELLETT  2,426,245
TIME AND DISTANCE MEASURING SYSTEM
Filed Oct. 9, 1943  6 Sheets-Sheet 6
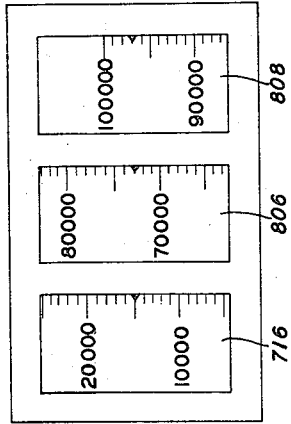
FIG. 10
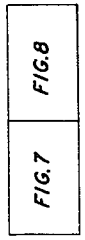
FIG. 9
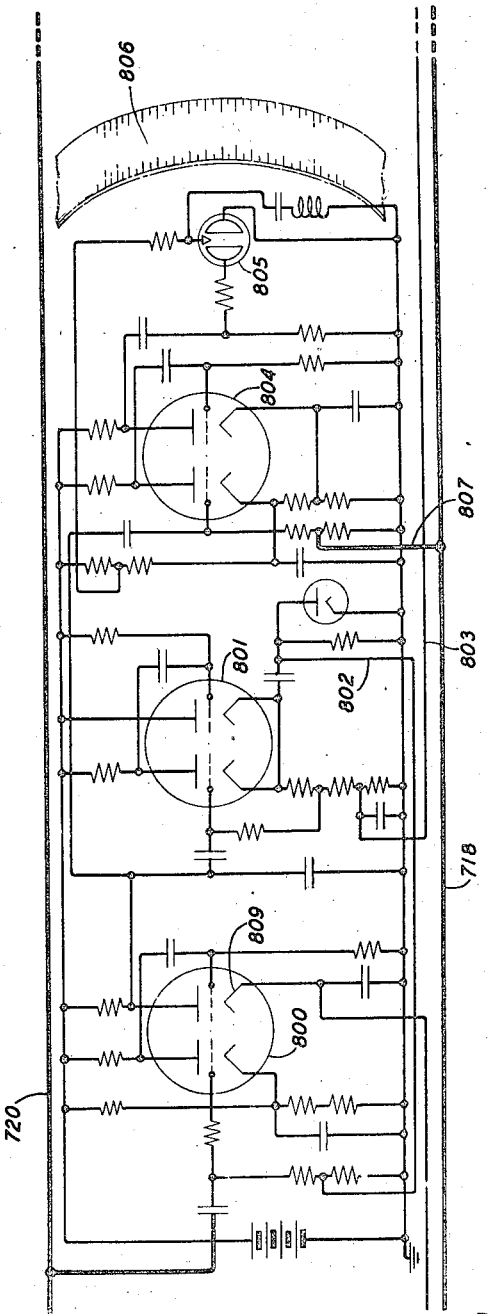
INVENTOR
A. M. SKELLETT
BY
Franklin Mohr
ATTORNEY Patented Aug. 26, 1947

2,426,245

UNITED STATES PATENT OFFICE 2,426,245

TIME AND DISTANCE MEASURING SYSTEM

Albert M. Skellett, Madison, N. J., assignor to Bell Telephone Laboratories, Incorporated, New York, N. Y., a corporation of New York Application October 9, 1943, Serial No. 505,673

5 Claims. (Cl. 250—1.62)

This invention relates to systems for measuring time and distance by means of traveling waves, and more particularly to means for exhibiting the results of such measurements on scales or indicators stroboscopically illuminated.

While the invention may be used in many other organizations where time or distance measurements are required, the illustrative embodiments disclosed hereinafter are of the type known as radar systems, in which an electromagnetic wave is transmitted from a given point to a distant surface or object and a reflection is received at the first point, the distance of the object or surface being measured by the time required for the wave to travel to the remote point and for the reflection to return.

The stroboscopic type of indicator is designed to replace the cathode-ray type of indicator commonly used in radar systems. The stroboscopic indicator is based on the stroboscopic illumination of moving or rotating scales and dials, the flashes of light being set off by the received reflections. The range, azimuth, and elevation readings may appear in numerical form in windows as if the scales on which the numbers are laid out were stationary at the correct values for the reflecting object in question. Two-dimensional field images such as map-like representations in polar coordinates may also be provided like those produced in cathode-ray tubes but of greater brilliance and size. These may or may not employ screens in which the glow persists momentarily after illumination. Automatic switching may be provided so that the apparatus assigns reflections received from a plurality of objects to different windows which give simultaneous readings.

The invention has among its advantages simplicity, increased ruggedness, low voltage operation, increased accuracy.

A further advantage is the low speed of the rotating parts, which need not exceed 1800 revolutions per minute.

An object of the invention is to reduce personal error in reading the range, azimuth or elevation of the reflecting object, particularly in the case of an unskilled observer.

As used in radar indicators the cathode-ray tube operates by moving a pencil of electrons over a stationary scale, the electron beam being modulated at each sweep to give an indication at the same fixed position on the scale. Thus an apparently stationary mark is observed. The stroboscopic type of indicator operates on a reverse principle. The scale moves at high speed past a fixed index and the illumination of the scale is modulated so as to give a flash of light whenever the correct part of the scale is opposite the index. The effect upon the observer is the same in either case, namely, the appearance of a stationary mark on a stationary scale.

In measuring range by reflected pulses it has not been found practical to use a scale rotating in synchronism with the outgoing pulses and making one revolution per pulse. The reasons for this are, first, that the speed required of the rotating scale is too high, and second, that it is not possible to synchronize a rotating scale with the outgoing pulses in some radar systems because the pulses are not emitted at a uniform time rate.

In accordance with the invention, low speed scales may be used and a considerable amount of "jitter" or irregular spacing of the outgoing pulses may be tolerated.

For the azimuth or elevation scales it is entirely practical to synchronize the scales with the motion of the antenna. At the relatively slow speeds of the azimuth and elevation scales the flicker of the flashes may be observable in some cases but this will present no serious difficulty since the overall effect is that of a stationary dial or scale illuminated with intermittent rather than steady light.

In accordance with the invention, at the instant of sending out the wave impulse, a charging or discharging current is started in a relatively fast timing circuit which may comprise a simple series combination of a resistor and a condenser, to develop a series of potential values. It is contemplated that a considerable number of impulses will be sent out in rapid succession, each impulse starting a new cycle of the fast timing circuit. Provision is made for restoring the timing circuit to a standard initial condition after each cycle. Meanwhile, a scale-bearing member is rotated at a convenient constant speed, the scale covering distances or time intervals from zero up to any desired maximum within the limits of the associated structure. At each revolution of the scale, a relatively slow timing circuit is actuated to pass through a series of potential values commensurate with the potentials developed in the fast timing circuit. A normally blocked vacuum tube is provided in the grid-cathode circuit of which the instantaneous potentials in the fast and slow timing circuits are continually compared. At some one instant during each cycle of the fast timing circuit, these potentials are in the proper relation to unblock the tube. It is arranged that the tube acts as an automatic range gate that remains open for a certain brief interval of time during which, if a reflected pulse is received, the reflected pulse is enabled to cause a flash lamp to be lighted and illuminate the rotating scale. The scale may be so calibrated that when thus illuminated it shows the true distance or range of the object from which the reflected wave is received.

Because of the relatively slow rate of rotation of the scale and the corresponding change of potential in the slow timing circuit, the range gate operates a little later in each succeeding cycle of the fast timing circuit. Thus the timing of the range gate moves along the pulse interval or total range time of the apparatus in synchronism with the rotating scale.

The fast timing circuit may be arranged to execute as many as 800 to 2000 or more cycles per second in a system capable of measuring ranges up to 100,000 yards. The slow timing circuit may conveniently execute about 30 cycles per second. An object at a given range will then cause the lamp to flash once during each cycle of the slow timing circuit, or 30 flashes per second, which gives the effect, due to the persistence of vision, of a steadily illuminated sttionary scale which is easily read against a fixed index mark. Thus the scale continuously exhibits the range of the object as long as the reflected pulses are received.

The system of the invention may be utilized in many embodiments, a number of which are illustrated and described hereinafter. The simple one-dimensional or range indicating system may be combined with azimuth and elevation indicating equipment with additional scales stroboscopically illuminated to exhibit the azimuth and elevation of the object. Provision is made for expanding the range scale to permit greater precision of measurement at any range. Range readings of two or more objects may be exhibited simultaneously on a single scale or on separate scales and where a single approximate scale is used to exhibit readings on a plurality of objects, manual gates may be provided for selecting individual objects for more accurate readings on separate scales. There is also disclosed an automatic register for indicating the ranges of two or more objects on separate dials without the necessity for employing a manual range gate.

In connection with the provision for expanding the range scale to permit greater precision of measurement at any range, there is disclosed herein a scale changing system which is claimed in my copending application Serial No. 627,491, filed November 8, 1945, and assigned to the same assignee as the present application.

The present application discloses a manual range gate which is claimed in my copending application Serial No. 627,493, filed November 8, 1945, and assigned to the same assignee as the present application.

The automatic register disclosed herein for indicating on separate dials the ranges of two or more objects without the necessity for employing a manual range gate, is claimed in my copending application Serial No. 627,492, filed November 8, 1945, and assigned to the same assignee as the present application.

In the drawings,

Fig. 1 is an elevational view of the indicator panel in a one-dimensional indicating system embodying the invention;

Figs. 2 and 3 constitute a schematic diagram of the electrical and mechanical apparatus associated with the panel of Fig. 1, when these figures are arranged as in Fig. 4;

Figs. 7 and 8, when arranged as shown in Fig. 9, constitute a schematic diagram of an automatic register system for exhibiting the ranges of two or more objects simultaneously on separate dials; and Fig. 10 is an elevational view of the dials associated with the system of Figs. 7 and 8.

*One-dimensional indicating system*

One embodiment illustrative of the invention is shown in Figs. 1 to 4, inclusive. This embodiment is restricted to measurement of a single dimension, namely, the range. In a class A representation, horizontal extensions indicate range or distance, and a vertical line or mark indicates the location of an object at a distance shown by the horizontal position of the line or mark. Provision is made to display a class A representation of the ranges of several distant objects simultaneously against a calibrated scale from which the approximate range of each object may be read directly, for example in yards. There is also provided a single range dial from which may be obtained a more accurate reading of the range of any desired one of the distant objects. A manual range gate is provided and associated with a movable marker in the class A indicator so that a particular object, the range of which it is desired to register on the range dial, may be readily selected. The object selected may be changed for another whenever desired by repeated manipulation of the range gate. An expanded scale is provided whereby the precision of the range measurement indicated by the range dial may be increased by a predetermined factor when desired, a factor of ten being preferred. The range dial and the class A range indicator comprise rotating elements each of which is stroboscopically illuminated only at those instants when it presents a correct range reading.

Figure 1:
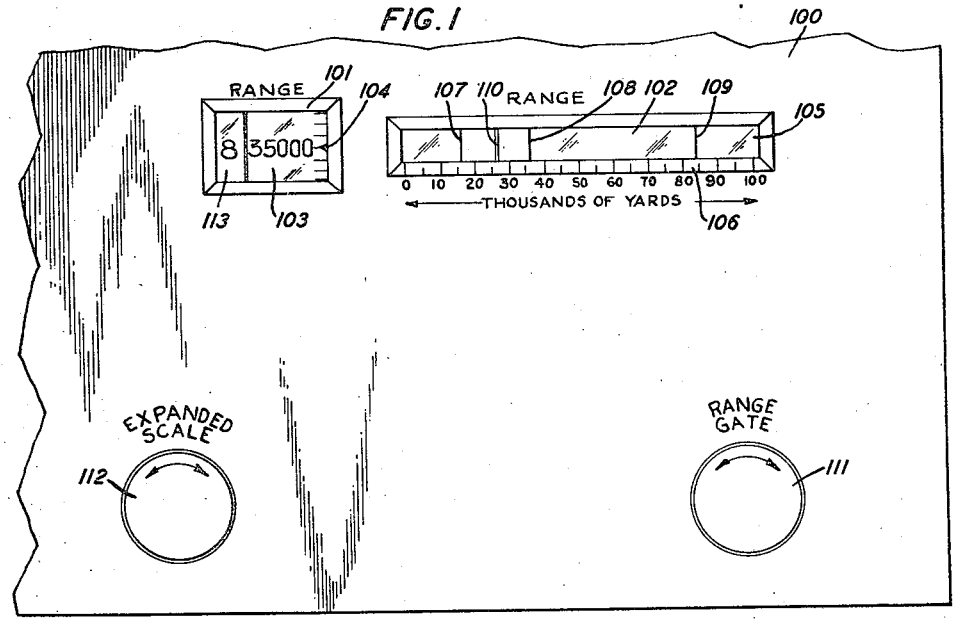

Fig. 1 shows the external appearance of the device as it may be arranged for the convenience of an operator. A portion of the indicator panel is shown at 100 and is provided with windows 101 and 102 which may have suitable frames or bezels. Behind the window 101 is mounted a range dial comprising a drum 103, preferably translucent, upon which are placed indications such as a numerical scale of ranges. Provision is made for rotating the dial 103 and illuminating it stroboscopically when a correct range indication appears within the window 101 at a stationary index 104 that may be placed before the dial 103 to fix the exact point of reading. Behind the window 102 is provided a rotating drum 105 with a helical mark which is made to appear, when stroboscopically illuminated, as a vertical or nearly vertical line segment showing through the window. A stationary scale 106 is provided for reading the position of the line segment when illuminated. The drum 105 may be illuminated a number of times during each revolution to produce a plurality of lines such as are shown at 107, 108 and 109 to indicate the ranges of objects at different distances. An arbitrarily movable line 110, which may be distinguished from the lines 107 to 109, inclusive, in any suitable way as for example by a different color of illumination, may be provided under manual control of a knob 111 to aid in selecting one of the distant objects the range of which is to be indicated more precisely by the reading of the dial 103. Another knob 112 may be provided to control an expanded scale and the associated indication of a separate dial 113 mounted next to the dial 103 and appearing within the window 101. The dial 113 is stationary except when rotated manually by means of the knob 112 and is illuminated together with the dial 103 by the stroboscopic light source. The mechanism associated with the panel 100 will be described hereinafter with reference to Figs. 2, 3 and 4.

The manner in which the system is manipulated by the operator may be described with reference to Fig. 1, it being assumed that the internal mechanism is operating and has been properly adjusted. First, it will be appreciated that the external appearance of any stroboscopically illuminated device will generally differ from the external appearance of the same device when viewed in ordinary illumination. For convenience in explaining the operation of the system and at the same time to make the view in Fig. 1 consistent with the other figures, it has been chosen to make Fig. 1 a composite view. The window 102 is assumed to be viewed with the drum 105 revolving and stroboscopically illuminated. The operator sees in the window 102 the marks or lines 107 to 110, inclusive, as shown in Fig. 1. The dial 103 is shown as if stationary and under steady illumination. As this dial actually is revolving along with the drum 105 at a rapid rate it would appear blurred and unreadable unless the movable range mark 110 were placed in coincidence with one of the lines 107 to 109, inclusive, and the knob 112 were properly set as explained hereinafter. In using the system, the operator, observing the lines 107 to 109, inclusive, decides which one of the objects represented by these lines is of special interest and he turns the knob 111 to move the mark 110 to coincide with the desired line and adjusts the knob 112 properly as explained hereinafter. The dials 103 and 113 are then stroboscopically illuminated to show the range of the selected object legibly and apparently stationary opposite the index 104. Another object may be thereafter selected by turning the knob 111 to bring the mark 110 in coincidence with the second selected line and by readjusting the knob 112 if need be, when the stroboscopic illumination of the dials 103 and 113 will change to display the range of the second object. Within the window 101, an illustrative range reading is shown on the expanded scale, indicating an object at a range of 33,500 yards. This reading could be observed by bringing the mark 110 to coincide with the line 109. To dispense with the expanded scale and use what is commonly called the main scale, the knob 112 may be turned until a numeral 0 appears on the dial 113 and a step further to operate a switching mechanism which may be mechanically coupled to the knob 112 to switch over the electric circuit from a condition termed the expanded scale condition to one termed the main scale condition as hereinafter described.

Figure 3:
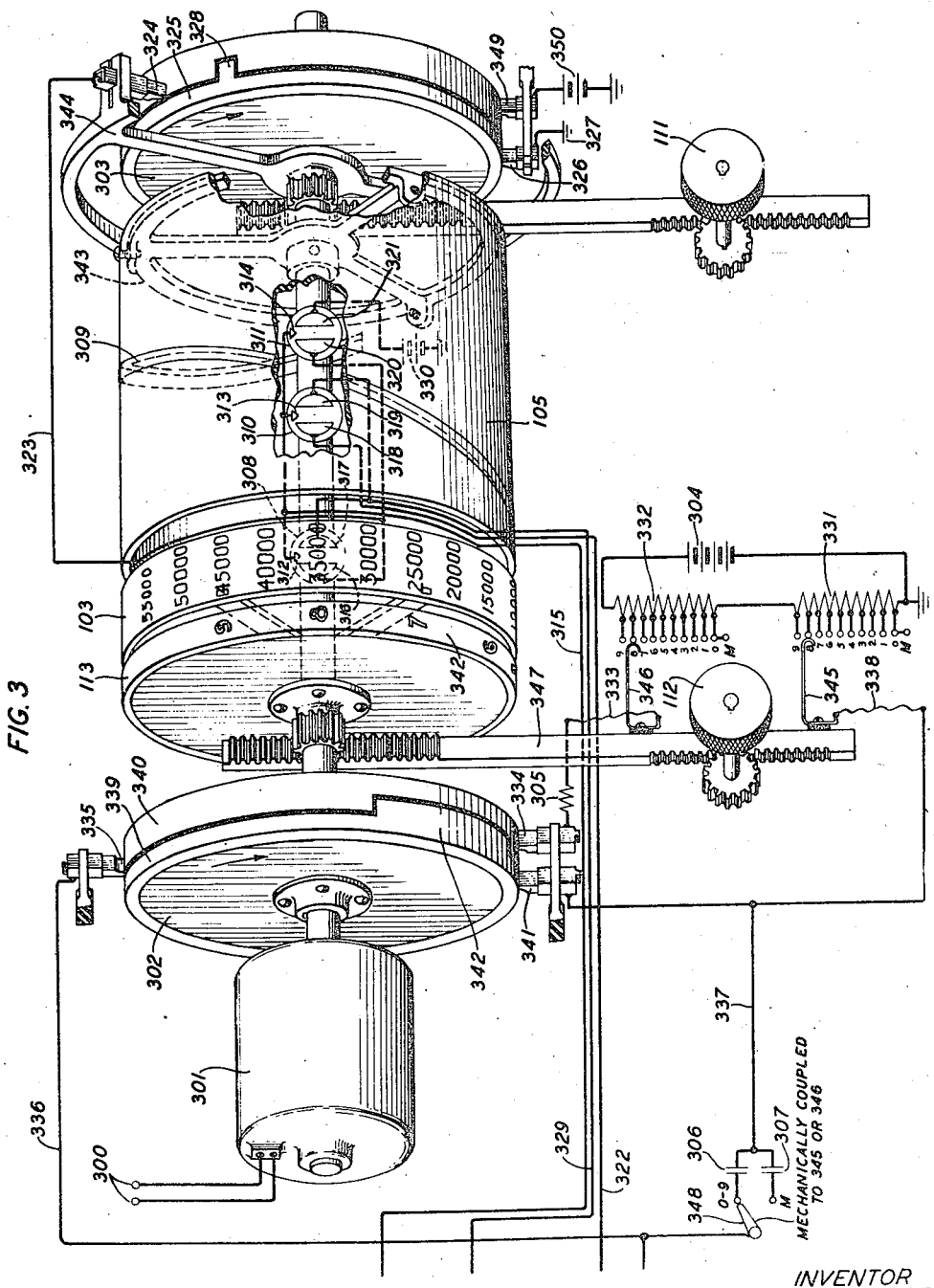

Figs. 2 and 3 show the mechanism and circuits behind and associated with the panel 100 of the device shown in Fig. 1.

In Fig. 2 a pulsing circuit 200 is shown connected both to an oscillator 201, preferably of ultra-high frequency, and a square wave generator tube 202 which with connected elements will be referred to as the start-stop circuit. The oscillator 201 is connected to a suitable radiating system such as a dipole antenna 203 mounted at the focus of a paraboloidal projector 204. The output of the start-stop circuit is connected to the grid circuit of a vacuum tube 205 in the anode circuit of which is connected a timing resistor 206 and condenser 207. The condenser 207 is also connected in the input circuit of a square wave generator tube 208, which serves as a narrow automatic range gate. For the reception of electromagnetic waves there may be provided a directionally selective receiving system comprising a dipole antenna 209 mounted at the focus of a paraboloidal reflector 210. The antenna 209 is connected to the input of a radio receiver 211 the output of which is combined with the output of the tube 208 in the input circuit of amplifying tube 212.

In Fig. 3 suitable power terminals 300 are shown connected to a motor 301 to the shaft of which are keyed the dial 103, the drum 105 and a pair of rotary switches or commutators 302 and 303. The commutator 302 is connected with a source 304 of direct current and a timing resistor 305 and either one of two condensers 306 and 307. The dial 103 may be translucent and may have mounted within it a flash lamp 308, which may be a neon lamp. The drum 105 may be opaque except for a helical slot 309 which either may be open or may have a filling of a translucent material. Within the drum 105 may be mounted flash lamps 310 and 311, preferably giving different colors of illumination such as a neon lamp 310 and an argon lamp 311.

The broad principle of operation and the salient features of the structure of Figs. 1 to 3, inclusive, will first be briefly given before presenting a more detailed description. The power supplied to the terminals 300 may be conveniently in the form of 60-cycle alternating current to drive a common type of motor at a speed of approximately 1800 revolutions per minute, that is about thirty revolutions per second. This particular speed is not essential but has been found both suitable and convenient. The motor 301 drives the dial 103, the drum 105 and the commutators 302 and 303 directly at this speed. At a preferably more rapid rate, say 200 to 1,000 or more times per second, the pulsing circuit 200 briefly energizes the radio transmitter 201 to deliver a short train of waves to the antenna 203, which train is projected as a pulse of electromagnetic waves from the projector 204. Simultaneously with the energization of the radio transmitter, the pulsing circuit energizes the tube 202 to generate a square-topped pulse used to block the tube 205 and start a charging current in the resistor 206 and condenser 207. The tube 205 and associated timing elements will be hereinafter referred to as the fast timing circuit. The time constant of the circuit is preferably so predesigned that the potential of the condenser 207 will pass through a suitable range of values at a substantially linear time rate during the brief time required for an electromagnetic pulse to travel from the projector 204 to the most distant object the range of which is to be measured and to return to the reflector 210. The commutator 302 is arranged to connect the battery 304 to the other timing circuit comprising the resistor 305 and the condenser 306 to charge the condenser 306 at a rate relatively slow compared with the condenser 207 to cover a similar suitable range of potentials on the condenser 306 during a single revolution of the commutator. This latter timing circuit will hereinafter be referred to as the slow timing circuit. Due to the relatively slow rate of revolution of the mechanical system, it is permissible to facilitate the description by assuming for the time being that the dial 103 and drum 105 remain stationary during the time between two pulses of the pulsing circuit 200. It is also permissible at this point in the description to assume that the potential of the condenser 306 remains constant during the interval between two pulses. Provision is made to compare the potential of the condenser 306 and the potential of the condenser 207 in the grid-cathode circuit of the tube 208. At some instant during the period between successive pulses the potentials of the condensers 306 and 207 will be of the proper relation to each other to unblock the tube 208 and thereby initiate a square-topped pulse therein. The circuit of the tube 208 is preferably so designed that the square-topped pulse produced is one of relatively short duration. The tube 208, however, does not directly connect with the flash lamps but merely energizes or sensitizes the input circuit of the amplifying tube 212. The tube 212 will operate to flash the lamps 308 and 310 only if a reflected pulse is received by the radio receiver 211 during one of the brief intervals when the tube 212 is sensitized. The scale on the dial 103 is so calibrated that when the lamp 308 flashes the correct range of the distant object from which the reflected pulse was received is shown within the window 101 opposite the stationary index 104. The stationary scale 106 adjacent the frame 102 is so calibrated also that when the lamp 310 flashes the portion of the slot 309 which is illuminated and shows through the window 102 is opposite the same range reading on the scale 106 as is simultaneously appearing on the dial 103.

The illumination of the lamp 308 is preferably further restricted under the control of the manual range gate so that the dial 103 will not be illuminated unless the range of the distant object and the setting of the manual range gate agree. The lamp 310 on the other hand is preferably not under the control of the range gate so that it may flash whenever the range of a distant object agrees with the position of the slot 309 with respect to the scale 106. The lamp 311 is preferably entirely independent of the reflected pulses and of the action of the tube 212 and may be controlled solely by the setting of the range gate to flash once per revolution of the drum 105.

Returning now to the effect of the rotation of the mechanical systems, the shaft and attachments will no longer be considered as standing still. During each interval between pulses the dial 103, drum 105 and the commutators 302 and 303 will have moved a small fraction of a revolution and the potential of the condenser 306 will have increased accordingly. The dial 103 and the drum 105 have advanced to a slightly higher range reading. The critical relation of potentials of the condensers 207 and 306 now occurs at a slightly later epoch with respect to the start of the outgoing pulse from the projector 204. As a result the tube 208 will energize the tube 212 at a correspondingly later epoch and the lamps 308 and 310 will flash only in response to an incoming reflected pulse from a somewhat more distant object, the range of which corresponds to the new reading of the dial 103 and drum 105. Accordingly, in each succeeding cycle of the pulsing circuit 200 the lamp control circuits will be energized at the particular epoch which corresponds to the range reading simultaneously presented at the windows by the dial 103 and the drum 105. During each revolution of the mechanical system the lamp control circuits will have been briefly energized successively at a succession of range readings distributed over the total range of the apparatus. When the range reading corresponds to the range of an object the reflected pulses from that object will be enabled to flash the lamps at least once during the revolution. As the speed of rotation is sufficient to provide 30 flashes per second a substantially flickerless scale reading is obtained.

In order that no pulses be lost due to being returned from objects having ranges that lie between the successive range readings for which the lamp control circuits are energized, the automatic range gate should be open each time for a sufficient interval to admit all returning pulses from objects in a zone of a certain width. The ratio of the frequencies of the fast and slow timing circuits determines the width of the zone to be included by the range gate, or, as it may be more briefly termed, the width of the range gate. This should be as wide as the difference in the successive range readings for which the circuits are energized to insure that all reflected pulses will operate the flash lamp. For example, with a motor speed of 30 revolutions per second and a pulsing rate of 2000 pulses per second, the range gate should have a width of about 1½ per cent of the maximum range, or 1500 yards in 100,000 yards. For an expanded scale of ten times the sensitivity of the main scale, the range gate width in this example may be reduced to one-tenth or 150 yards. The actual readings may be more accurate than the frequency ratio indicates, due to the fact that unless the frequencies are exactly commensurate succeeding readings on the same range will vary slightly and the eye will naturally read the average of the values presented by the scale.

The lamp 310 will flash once per revolution for each received pulse and when several pulses are received from objects at different ranges the lamp 310 will flash when the slot 309 is opposite each of a number of different readings on the scale 106 producing a plurality of lines such as 107 to 109, inclusive. The commutator 303 will flash the argon lamp 311 once for every revolution of the drum 105 at a particular angular position which may be controlled by means of the knob 111 to produce an arbitrarily movable mark 110 of a different color from the lines 107 to 109, inclusive. By moving the mark 110 to coincide with one of the lines such as 107 to 109, inclusive, the lamp 308 will be made to flash to show a precise reading of the range corresponding to the particular line selected by the operator.

The purpose of the expanded scale is to cover a restricted group of ranges with a more precise balance of voltages in the input of the tube 208 as well as with a narrower range gate. The particular portion of the scale 106 to be covered by the expanded scale is indicated by the dial 113 which places an additional digit in front of the reading of the scale 103 by means of a mechanism which will be more fully described hereinafter.

The circuits shown in Fig. 2 will now be described in somewhat greater detail.

*Start-stop circuit*

The start-stop tube 202 may contain, in a single envelope, if desired, two triodes 213 and 214, the triode 213 including a cathode 215, a grid 216, and an anode 217 and the triode 214 including a cathode 218, a grid 219 and an anode 220. A supply source 221, such as a battery, may have its negative terminal grounded as at 222. The positive terminal of the source 221 may be connected to the anode 217 through an anode load resistor 223 as well as directly to the anode 220 and through a grid load resistor 224 to the grid 219. The cathodes 215 and 218 may be connected to ground through cathode resistors 225 and 226. The pulsing circuit 200 may be connected to the grid 216 by a blocking condenser 227. A grid resistor 228 is preferably connected between the grid 216 and the common terminal of the cathode resistors 225 and 226. A coupling condenser 229 is provided between the anode 217 and the grid 219.

In the operation of the start-stop circuit, the triode 214 is normally conducting because of the connection of the grid 219 with the positive terminal of the supply source 221 through the resistor 224. The anode-cathode current of the triode 214 flowing through the properly proportioned resistor 225 provides a blocking potential upon the grid 216 which renders the triode 213 normally non-conducting. The connection of the grid 219 to the positive terminal of the source 221 through the resistor 224 renders the grid potential positive with the result that grid current flows through the triode 214 and adds to the biasing current in the resistor 225. The triode 213 has substantially the full supply voltage impressed across between its anode and cathode although, as aforementioned, anode current is blocked by the negative potential impressed upon the grid 216 by the current flowing in the resistor 225. This condition of the start-stop circuit is a stable one but it may be disturbed by the receipt of a pulse from the circuit 200.

The pulsing circuit 200 is preferably arranged to impress a pulse upon the grid resistor 228 through the blocking condenser 227, the pulse being of such polarity as to render the grid 216 more positive with respect to the cathode 215. The pulse is preferably of sufficient strength to overcome the negative bias impressed upon the grid 216 by the resistor 225, thereby rendering the triode 213 conductive. The flow of current from the source 221 through the resistor 223 and the anode-cathode circuit of the triode 213 produces a drop in the potential of the anode 217. As a result, the charged condenser 229 begins to discharge through the resistor 224 and at the same time the condenser 229 effectively places a negative bias upon the grid 219, thereby causing the triode 214 to cut off its own anode-cathode current. The cessation of the current in the triode 214 removes some of the negative bias from the grid 216 and enables the supply source 221 to maintain the anode-cathode current in the triode 213 even though meanwhile the activating pulse from the circuit 200 may have ceased. The condenser 229 continues to discharge through the resistor 224 and when sufficiently discharged, the triode 214 again becomes conductive and its anode-cathode current restores the negative bias in the resistor 225 to cut off the anode-cathode current in the triode 213, thereby returning the start-stop circuit to the original stable condition. The time required for the cycle of operations in the start-stop circuit is determined mainly by the capacitance of the condenser 229 and the resistance of the resistor 224. The cycle may be repeated by supplying successive pulses to the grid 216 from the pulsing circuit 200. The start-stop circuit develops a good square-topped wave between the cathodes 215 and 218 and the ground 222 which wave may be impressed upon the grid of the trigger tube 205 by means of a blocking condenser 230 and a grid resistor 280.

Fast timing circuit

The fast timing circuit comprises the vacuum tube 205, the resistor 206 and the condenser 207. The tube may be a pentode having a cathode 231, a control grid 232, a screen grid 233, a suppressor grid 234 connected to the cathode, and an anode 235. The cathode 231 may be grounded and the anode 235 may be connected to the positive terminal of the source 221 through the resistor 206.

In the operation of the fast timing circuit, the grid 232 normally maintains the tube 205 in a conducting condition due to the potential drop across the resistors 225 and 226 being balanced with respect to the grid 232 by a charge on the condenser 230. When the potential across the resistors 225 and 226 falls during the operation of the start-stop circuit, this drop in potential transmitted through the condenser 230 impresses a negative potential upon the grid 232, thereby blocking the tube 205 and permitting charging current to flow to the condenser 207 through the resistor 206. At the end of the square-topped pulse when the potential difference across the resistors 225 and 226 is restored, the grid 232 returns to substantially ground potential, rendering the tube 205 conducting and permitting rapid discharge of the condenser 207 through the tube 205.

Automatic range gate

The automatic range gate comprises the square wave generator 208 and associated circuits. The tube 208 may contain, in a single envelope, if desired, two triodes 236 and 237, the triode 236 including a cathode 238, a control grid 239 and an anode 240 and the triode 237 including a cathode 241, a control grid 242 and an anode 243. The cathode 241 may be directly grounded and the cathode 238 may be connected to ground through a coupling condenser 244. The anodes 240 and 243 may be connected to the positive terminal of the source 221 through anode circuit resistors 245 and 246, respectively. The anodes 240 and 243 may be cross-connected to the grids 242 and 239, respectively by coupling condensers 247 and 248. The grid 239 may be connected to the positive terminal of the condenser 207 through a coupling resistor 249. The grid 242 may be connected to ground through either one of two resistors 250 and 251 under the control of a switch 252.

In the operation of the automatic range gate, the potential of the condenser 207 is continuously compared with the potential of a selected one of the condensers 306 and 307 in the grid-cathode circuit of the triode 236. The potential of the condenser 207 acts by virtue of direct connection in the grid-cathode circuit, while the potential of condenser 306 or 307 is impressed upon the cathode 238. The potential of the cathode 238 is thus changing at a slow rate and the potential of the grid 239 is changing at the fast rate. At the start of each fast cycle the grid potential is more negative with respect to that of the cathode 238 than the cut-off voltage of the triode and as it rises this cut-off potential is reached and the triode 236 starts to conduct. Before this critical potential relation is reached the triode 237 is conducting due to the grid 242 being connected to the cathode 241 through one of the resistors 250 and 251, and the coupling condenser 247 contains a charge of substantially the full voltage of the source 221. When the triode 236 becomes conducting, its anode potential falls due to the flow of current in the resistor 245, and this potential drop is impressed on grid 242 through condenser 247, thereby immediately blocking the triode 237. The condenser 247 rapidly discharges through the resistor 250 or 251, removing after a definite interval the blocking potential from the grid 242 and permitting current to flow again. It will be noted that while the triode 237 was blocked, the coupling condenser 248 was being charged through the resistor 246, 249 and the condenser 207. When the triode 237 has resumed conductivity, the charge on the condenser 248 is effectively thrown across between the grid 239 and the cathode 238 to form a blocking potential to aid in restoring the triode 236 to the normal condition. The generator 208 thus produces a square-topped pulse preferably of brief duration which is impressed upon the input circuit of the flashing tube 212. During the normal blocked condition of the triode 236, the triode 237 is conductive and hence the anode 243 may be arranged to be very little above the potential of the cathode 241. During the brief period of blocking in the triode 237, the anode 243 assumes substantially the full battery potential. The potential variation of the anode 243 thus constitutes a narrow square-topped wave of potential. The duration of the narrow pulse may be varied by means of the switch 252 to select one or the other of the resistors 250 and 251 through which to discharge the condenser 247.

*Flashing circuit*

The flashing circuit comprises the tube 212 and associated elements. The square-topped wave from the generator 208 is impressed upon the flashing circuit through a coupling condenser 253. The flashing tube 212 may contain, in a single envelope, if desired, two triodes 254 and 255, the triode 254 including a cathode 256, a grid 257 and an anode 258 and the triode 255 including a cathode 259, a grid 260 and an anode 261. The ungrounded side of the radio receiver 211 may be connected to the grid 257 through a coupling condenser 262 and the output of the automatic range gate may be connected into the grid-cathode circuit of the triode 254 by means of the coupling condenser 253. The tube 212 comprises two stages of amplification. Normally the grid 257 is biased more negative than its cut-off potential so that echoes from the radio receiver cannot get through to operate the flashing lamps 308 and 310. When the range gate is impressed on this grid it brings its potential to cut-off and the echoes, which are of positive potential can then get through to triode 255 where they are amplified for use in triggering off the flash tubes 308 and 310. Thus the tube 212 is operated when a signal is received by the radio receiver 211 provided at the same time the triode 254 is unblocked by the action of the tube 208.

*Flash lamps*

The flash lamps 308, 310 and 311 are preferably of the three-electrode cold type. The tubes 308, 310 and 311 have anodes 312, 313 and 314, respectively, all of which are permanently connected across a condenser 266 and a series inductance 268 through a lead 315 and through the lead 315 and a resistor 267 to a junction point 264 in a potentiometer across the source 221. The tube 308 has a pair of control electrodes 316 and 317 and the tubes 310 and 311 have corresponding pairs of control electrodes 318, 319 and 320, 321. Ground connection is supplied over a lead 322 in a permanent connection to the control electrode 318 of the tube 310 so that this tube will flash whenever an exciting potential is impressed upon its second control electrode 319. Ground connection is supplied to the control electrodes 316 and 320 of the tubes 308 and 311, respectively, through a lead 323, a brush 324, a conductive band 325 of the commutator 303, a brush 326 to ground at 327 only during the passage of the brush 324 over the projection 328 of the band 325. At all other times the brush 324 connects the electrodes 316 and 320 through another brush 349 to a disabling positive potential such as is supplied by a battery 350. The second control electrodes 317 and 319 of the tubes 308 and 310, respectively, are connected through a lead 329 to a junction point 265 in the output circuit of the flashing tube 212. These tubes 308 and 310 receive over the lead 329 a flashing voltage upon receipt of a reflected radio wave by the system at a time when the automatic range gate is open. The control electrode 321 of the tube 311 is permanently connected to the positive terminal of a source 330 illustrated as a battery. The battery 330 becomes effective to flash the tube 311 whenever the ground connection is applied to the other control electrode 320 by the commutator 303.

In the operation of the tubes 308, 310 and 311 it will be evident from the foregoing description of the connections that the tube 311 will be operated once during each revolution of the commutator 303 when the brush 324 crosses the projecting segment 328. The tube 308 will flash provided a radio impulse is received while the automatic range gate and the manual range gate are both set for substantially the correct range. The tube 310 will operate independently of the manual range gate whenever a radio impulse is received during the open condition of the automatic range gate. Each flash of the lamps discharges the condenser 266 which is then recharged at a definite rate through the resistor 267 and the inductor 268 in time for the next flash.

*Slow timing circuit*

The slow timing circuit comprises the source 300, the motor 301, the commutator 302, the potential source 304, the timing resistor 305 and the timing condensers 306 and 307. The source 304 is connected across a pair of serially connected potentiometers 331 and 332. Assuming the potentiometers 332 and 331 to be set each on step 8 as illustrated, a circuit is formed through a flexible lead 333 to the resistor 305, through a brush 334 on the commutator 302 to another brush 335 and then through a lead 336, to one of the condensers 306 and 307 and then through a lead 337 and a flexible lead 338 to step 8 of the potentiometer 331 and thence to ground. The commutator 302 comprises two conductive bands 339 and 340. The brush 334 runs continually on the band 340 and a brush 341 on the band 339. The brush 335 runs upon the band 340 except during a certain portion of each revolution when the brush 335 rests upon a projection 342 which is an integral part of the band 339. While the brush 335 rests upon the projection 342, the condenser 306 or 307 is short-circuited. When, during the revolution of the commutator 302, the projection 342 moves away from the brush 335, the condenser 306 or 307 begins to charge through the resistor 305. The charging of the condenser continues at a substantially uniform rate until the projection 342 is again brought under the brush 335 when the condenser is quickly discharged and made ready for a repetition of the charging cycle. The potentiometers 331 and 332 are preferably so arranged that the effective charging voltage is the same regardless of the steps occupied by the variable contacts of the potentiometers.

Rotating mechanical system

The commutators 302 and 303 are preferably keyed to the shaft of the motor 301. The dial 103 and the drum 105 are preferably fixedly attached to the shaft by suitable means such as spider structures 342 and 343, respectively. The dial 113 is preferably mounted freely on the shaft and may be geared to the knob 112 in known manner as, for example, by means of a suitable combination of racks and pinions. The brush 324 is preferably mounted on a spider structure 344 which rides freely on the shaft and is geared to the knob 111 through another suitable combination of racks and pinions. The remaining brushes are stationary and may be supported in any suitable manner. The lamp 308 may be mounted inside the dial 103 and the lamps 310 and 311 inside the drum 105. The necessary leads to the lamps may be introduced through the space between the dial 103 and the drum 105.

Angular displacement of the rotating parts

In setting the commutators 302 and 303 and the dial 103 and drum 105 on the shaft, the following considerations should be observed as to the relative angular positions of these elements. The dial 103, in a system intended to measure ranges up to 100,000 yards will preferably have a scale reading from 0 to 100,000 occupying a major portion of the periphery of the dial. A blank segment, shown in Fig. 3 for clarity as one-sixth of the complete circle is reserved to cover the interval of time required for the discharge of the slow timing circuit but this interval may be shortened considerably in practice. The helical mark 309 occupies the same proportional part of a complete circumference of the drum 105 as the numerical scale occupies in the complete circumference of the dial 103. The dial 103 and drum 105 are to be set in such a relative angular position that the reading of the dial 103 against the index 104 at the window 101 is identical with the reading of the mark 309 against the scale 106 at the window 102. The angular relation between the commutator 302 and the brush 335, should then then be such that when the trailing edge of the segment 342 of the commutator leaves the brush 335, the dial 103 registers zero against the index 104. The angular position of the commutator 303 on the shaft may be determined arbitrarily.

Main scale

When the expanded scale is not in use, the apparatus is said to be operating on the main scale. The potentiometers 331 and 332 are each provided with ten taps or positions, numbered from 0 to 9, inclusive, which are used with the expanded scale. An additional position M is provided adjacent to the zero position for use when operating with the main scale and is directly connected electrically in the potentiometer with the adjacent position 0. Potentiometer arms 345 and 346 for the respective potentiometers 331 and 332 are provided and may be insulatingly attached to a bar 347 in the rack and pinion system operated by the knob 112. In using the main scale the knob 112 is rotated to bring the arms 345 and 346 on to the respective M positions of the potentiometers. This operation results in a rotation of the dial 113 through zero to one position beyond zero, at which position there is no number showing at the window 101. The switches 252 and a switch 348 controlling the selection of the condensers 306 and 307 are preferably mechanically coupled to one of the potentiometer arms 345 or 346 in such a manner that the switches 252 and 348 are both operated whenever the arm 345 passes from the zero position to the M position or vice versa. For the main scale, the switches 252 and 348 are operated into the M position bringing the resistor 251 and condenser 307 into circuit for the main scale and the resistor 250 and condenser 306 for the expanded scale. In operation with the main scale, one terminal of the condenser 307 is grounded so that the potential impressed upon the condenser 244 by the slow timing circuit is simply the potential of the condenser 307. The resistor 251 is proportioned to give the desired width to the automatic range gate. The reading in the window 101 is shown by the number appearing on the dial 103.

Expanded scale

In operation with the expanded scale, when one of the marks such as 107, 108 and 109 appearing at the window 102 has been selected by the operator, the knob 112 is turned to bring the first digit of the range of the selected line into view in the window 101. For example, if the line 109 is chosen (reading approximately 83,000 yards on the scale 106) the digit 8 is brought into view in the window 101, as shown in Fig. 1. This operation moves the potentiometer arms 345 and 346 to the position 8 on the potentiometers 331 and 332, as illustrated in Fig. 3. It also operates the switches 252 and 348 to the 0–9 position, bringing into circuit the resistor 250 and the condenser 306. The condenser 306 is now in series with a potential provided between ground and position 8 of the potentiometer 331 and this potential is added on to the potential of the condenser 306 in the condenser 244 for comparison with the potential in the fast timing circuit. The potential impressed upon the slow timing circuit is the same regardless of the position of the potentiometers, when, as is preferable, the potential between each pair of corresponding positions on the two potentiometers is the same. The resistor 250 is preferably designed to reduce the width of the automatic range gate to one-tenth the value used with the main scale. The condenser 306 is preferably made ten times the capacity of the condenser 307 so that during the period of a single revolution the condenser 306 will acquire a potential only one-tenth as great as that attained by the condenser 307 when using the main scale. The potential difference between two adjacent positions of the potentiometers is thus spread out by means of the condenser 306 to occupy a complete cycle of the slow timing circuit. The reading in the window 101 is comprised by the reading of the dial 103 prefixed by the digit exhibited by the dial 113.

In the system as illustrated, switching over to the expanded scale expands the range covered by the drum 105 and the images in the long window 102. The scale 106 will then represent hundreds of yards instead of thousands as for the main scale and as the knob 112 is turned the portion of the total range covered by the scale 106 will be moved along the total range along with the indication of the dial 113.

Two-dimensional indicating system

Figure 5:
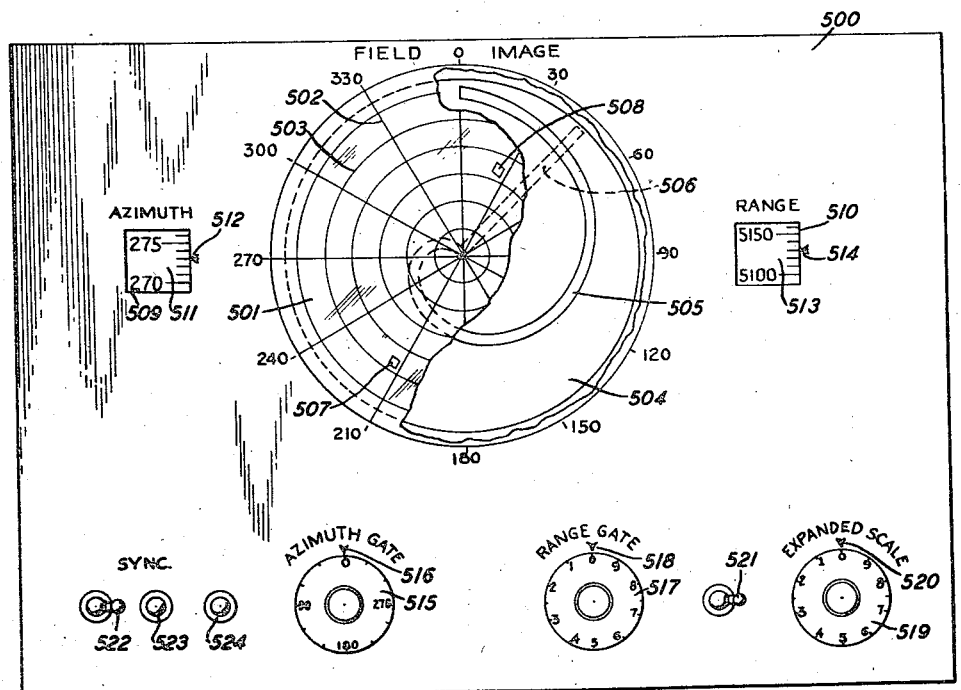
Fig. 5 is an elevational view of the indicator panel, partly broken away, for a two-dimensional indicating system embodying the invention.
Figure 6:
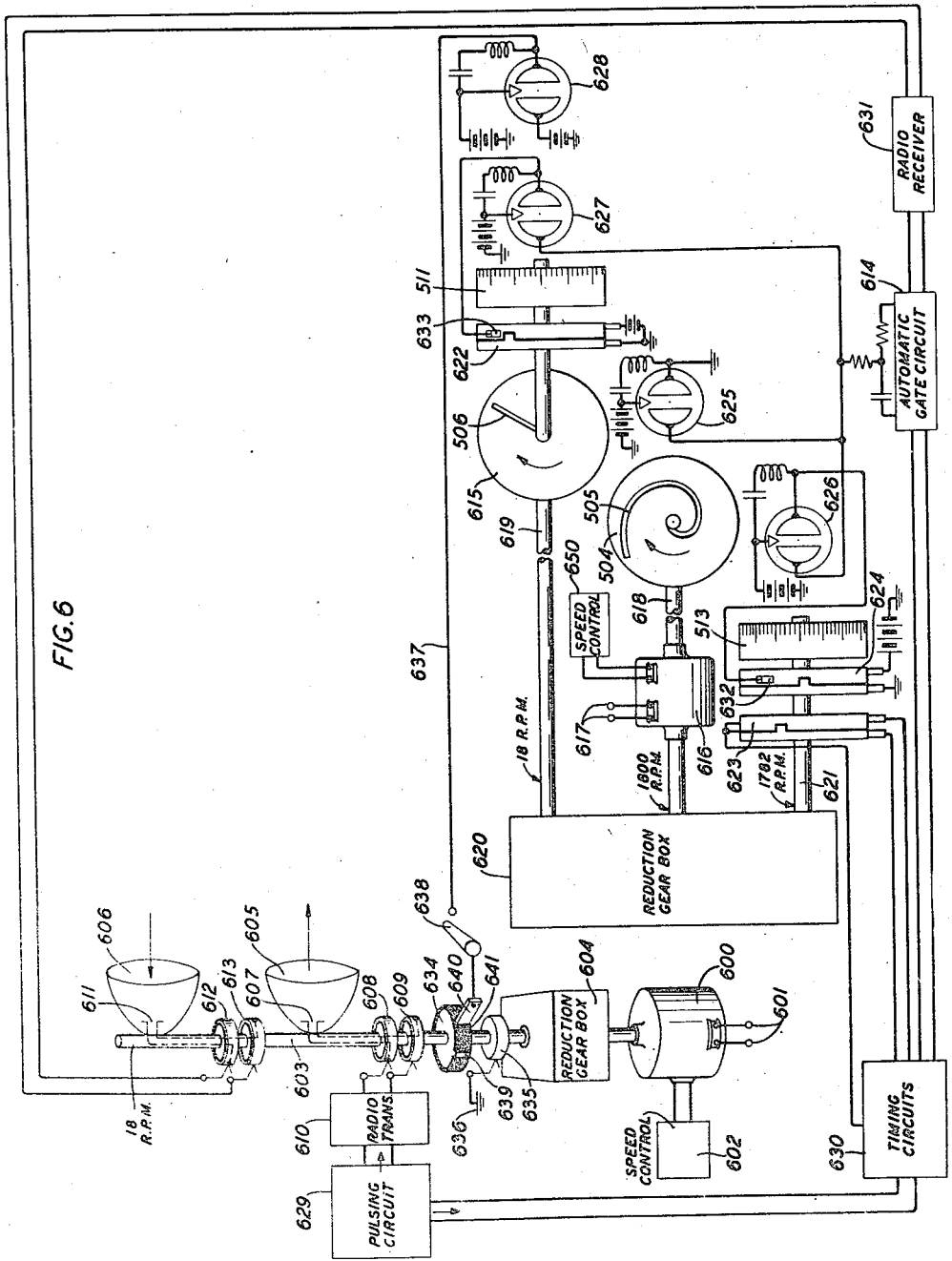
Fig. 6 is a schematic diagram of the electrical and mechanical features of the system associated with the panel of Fig. 5.

Another embodiment illustrative of the invention is shown in Figs. 5 and 6. Two dimensions, range and azimuth, are displayed in this system by a stroboscopic plane position indicator. The position of several objects may be shown simultaneously against the background of a calibrated polar diagram from which the approximate range and azimuth of each object may be read directly. For more accurate readings on a selected object, a range dial and an azimuth dial are provided. The latter dials are under the control of manual range and azimuth gates. An expanded scale is provided for use with the range dial and a synchronizing arrangement is included for bringing the azimuth indication into correct angular relationship with an associated rotating antenna system.

Fig. 5 shows the external appearance of the front panel with a portion broken away to show some of the mechanism within. The panel 500 includes a translucent circular area 501 upon which is marked a polar diagram of a field in which observations are to be made. Radial lines, such as 502, are shown at angular intervals of 30 degrees, and a plurality of concentric circular marks such as 503 provide a scale of ranges at intervals of 1000 yards as shown in Fig. 5. Either finer or coarser scales may, of course, be used as described. Centrally located behind the translucent circular area 501 is a rotatable disc 504 in which is cut a spiral groove 505. Behind and concentric with the disc 504 is another disc 615 (Fig. 6) also rotatable and having a radial slot 506. The intersection of the slots 505 and 506 defines an aperture which may be stroboscopically illuminated to produce a spot at any desired position on the indicators, as, for example, at 507 and 508. Windows 509 and 510 are provided through which respectively an azimuth scale 511 may be observed against an index 512 and a range scale 513 against an index 514. A rotatable knob 515 bearing a scale of angles is provided in conjunction with a fixed index 516 to operate a manual azimuth gate. A similar knob 517 bearing a scale of ranges is provided in conjunction with a fixed index 518 for operating a manual range gate. Similar to the knob 517 and index 518 are a knob 519 and index 520 for operating an expanded scale. A toggle switch handle 521 may be provided for selecting the main scale or the expanded scale according to need. The antenna synchronizer may be controlled by means of a toggle switch handle 522 and a pair of push-buttons 523 and 524.

The complete system of the plane position indicator is shown schematically in Fig. 6. In this figure a motor 600 energized by a suitable power supply at terminals 601 and preferably having a speed control means 602 is arranged to drive a vertical shaft 603 through a reduction gear box 604, if required. The shaft 603 carries with it in a single azimuthal plane a transmitting reflector 605 and a receiving reflector 606 for electromagnetic waves. The reflector 605 contains a suitable transmitting antenna such as a dipole 607 preferably mounted at the focus of the reflector and connected through slip rings 608 and 609 with a radio transmitter 610. The reflector 606 may contain a suitable receiving antenna such as a dipole 611 preferably mounted at the focus of the reflector and connected through slip rings 612 and 613 and suitable leads to a radio receiver 631 which is connected in turn to an automatic gate circuit 614. The rotatable disc 504 with the spiral slot 505 and the rotatable disc 615 with the radial slot 506 appear diagrammatically in Fig. 6. The discs 504 and 615 are rotated on a common axis at different speeds by a motor 616 actuated by a suitable power source at terminals 617 and preferably controlled by a speed control means 618. The disc 504 may be keyed to the shaft 618 of the motor 616. The disc 615 is rotated by a shaft 619 through a reduction gear box 620 preferably at the same speed as the shaft 603. A third shaft 621 is also driven by the motor 616 through the reduction gear box 620 preferably at a speed which is equal to the difference between the speeds of the shafts 618 and 619 for a reason which will appear hereinafter. The shaft 619, in addition to driving the disc 615, rotates a commutator 622 and the translucent azimuth dial 511. The shaft 621 rotates a pair of commutators 623 and 624 and the translucent range dial 513. A plurality of flash lamps 625 to 628, inclusive, are provided, of which the lamp 625 is mounted behind the concentric discs 504 and 615 to illuminate the intersection of the slots 505 and 506. The lamp 626 is preferably mounted inside the translucent range dial 513 and the lamps 627 and 628 within the azimuth dial 511.

The radio transmitter 610 is under the control of a pulsing circuit 629 which also controls the fast timing portion of a set of timing circuits 630, similar to the circuits shown in detail in Figs. 2 and 3. The slow timing circuit is controlled by the commutator 623 and in conjunction with the fast timing circuit and the received pulses from radio receiver 631 controls the automatic gate circuit 614. The latter in turn controls the flashing of the lamp 625 and provides control signals for the lamps 626 and 627. The lamp 626 is under the further control of a manually movable brush 632 on the commutator 624. The lamp 627 is likewise under control of a manually movable brush 633 on the commutator 622. Suitable means such as a commutator 634 and a slip ring 635 are provided for furnishing a connection from ground at 636 over a lead 637 to the lamp 628 to control the flashing of the lamp when a switch 638 is closed. The commutator 634 has a narrow segment 639 which provides the only conductive connection to the shaft and slip ring 635, the remaining segment 641 consisting of insulation. A brush 640 bears upon the commutator 634 and by suitable arrangement of the angular position of the segment 639 with respect to the plane of the reflectors 605 and 606 a ground connection is made when the plane of the reflectors is in the true north and south direction or, if desired, in the direction of some other arbitrary plane of zero azimuth. When the brush 640 is on the segment 639 the lamp 628 is caused to flash.

The angular position of the movable brush 633 on the commutator 622 is adjustable by means of the knob 515 of the manual azimuth gate. Similarly, the angular position of the movable brush 632 on the commutator 624 is adjustable by means of the manual range gate knob 517. The switch 638 in the synchronizing system is manually operated by means of the switch handle 522. For use in synchronizing, the speed control 602 of the antenna rotating system may be controlled by the push-button 523 and the speed control 618 of the indicating arrangement may be controlled by the push-button 524.

In the operation of the two-dimensional indicating system of Figs. 5 and 6, with the motors running at the proper speeds, and the other mechanisms properly adjusted, the shaft 603 rotates at a suitable speed, for example, 18 revolutions per minute, causing the reflectors 605 and 606 to scan the horizon at the selected rate which, in the example shown, is one revolution in approximately three seconds. The pulsing circuit 629 may operate at a suitable rate such as 200 to 1000 or more times per second, each time actuating the radio transmitter 610 to send out a brief train of waves from the antenna 607 and reflector 605. The transmitted pulse travels out mainly in the direction in which the reflector 605 is pointing and upon striking any reflecting object, a reflected wave or echo returns to the reflector 606 and receiving antenna 611 to produce a signal in the radio receiver 631. At the instant of sending and receiving a pulse, the radial slot 506 in the disc 615 has a certain angular position relative to the polar diagram 501 which identifies the direction in which the reflectors are pointed. Simultaneously with the energization of the radio transmitter 610, the pulsing circuit 629 actuates the timing circuit 630 and automatic gate circuit 614. The circuits operate in the same manner as the timing system of the one-dimensional indicating system of Figs. 1 to 4, inclusive, the functions being performed by a start-stop circuit, a fast timing circuit, a slow timing circuit, an automatic range gate and a flashing circuit, all substantially as previously described. The pulse from the circuit 629 actuates the start-stop circuit which initiates the timing cycle of the fast timing circuit. Meanwhile the slow timing circuit which is connected to the commutator 623 and includes elements in the box 630, is producing a certain potential. When the potential of the fast timing circuit bears the proper relation to the potential of the slow timing circuit, the automatic gate circuit 614 is sensitized for a brief interval of time. If the range of the object from which the echo is received corresponds to the range for which the automatic gate circuit has been sensitized, an impulse from the radio receiver 631 is relayed by the automatic gate circuit 614 to sensitize the flashing circuit. The operation of the flashing circuit flashes the lamp 625 to illuminate the intersection of the radial slot 506 and the spiral slot 505. The flashing of the lamps 626 and 627 which are also controlled by the automatic gate circuit is further controlled by the manual gates. The relative speed of the shafts 618 and 621 may be so adjusted that when the lamp 625 flashes, the proper range will be indicated by the intersection of the radial slot 506 and the spiral slot 505. As the range indication varies with the relative speed of the disc 504 compared to that of the disc 615, if the discs rotate in the same direction it is necessary to adjust the speeds so that the shaft 621 runs at the difference between the speeds of the two discs in order that the same indicator circuit may be used on both the range dial 513 and the plane position indicator. If the discs 504 and 615 rotate in opposite directions, then the speed of the shaft 621 should be the sum of the speeds of the two discs for the same reason. When these speed relationships are observed, the lamps 625 and 626 when flashed simultaneously will indicate the same range on the plane position indicator and range dial 513 at any azimuth.

The range dial 513 and the plane position indicator cover from zero to maximum range thirty times per second with the speeds chosen for illustration. During the thirtieth part of a second, the azimuth of the reflectors is not changed appreciably. Therefore it is evident that the system covers all ranges and every azimuth position. Suitable adjustment of the width of the automatic range gate is assumed as explained in relation to the one-dimensional system. The lamp 625 may flash at one or more ranges at the same or different azimuth. Each flash produces an illuminated spot such as 507 and 508.

The operator may select any one of the spot indications for more accurate reading. The procedure is as follows: The operator reads from the polar diagram 501 the approximate azimuth and range of the spot in question. He then adjusts the azimuth knob 515 to bring the approximate azimuth of the spot opposite the index 516. He also adjusts the range knob 517 to bring the approximate range opposite the index 518. The proper setting of the azimuth knob 515 causes the rotation of the brush 633 to an angular position such that the brush makes contact with the grounded segment of the commutator 622 at the instant when the azimuth dial 511 registers approximately the azimuth for which the knob 515 is set. Likewise the knob 517 causes the brush 632 to make contact with the grounded segment of commutator 624 when the range dial 513 is at approximately the range of the spot in question. The grounding of the commutator brushes 632 and 633 completes the sensitizing of the lamps 626 and 627 so that they will be flashed by the same impulse from the receiver 631 which flashes the lamp 625 to produce the spot in question. The reading of the scale 511 against the index 512 when the lamp 627 flashes is an accurate indication of the azimuth of the object under observation. Likewise the reading of the scale 513 against the index 514 when the lamp 626 flashes is an accurate indication of the range of the object.

To use the expanded scale the knob 519 is set to indicate the first digit of the range against the index 520 and the switch handle 521 is thrown to the on position. The indication in the range dial then changes to show a more accurate reading of the range, the first digit of the range now being that to which the knob 519 has been set. The following digits in the range are shown by the reading of the dial 513 against the index 514.

To adjust the zero azimuth indication of the system, the azimuth gate is set at zero and the switch handle 522 is thrown to the on position, thereby closing the switch 638. The lamp 628 behind the dial 511 then flashes each time the reflectors pass through the plane of zero azimuth. If the shafts 603 and 619 are operating at different speeds or are otherwise out of phase, the dial 511 will not indicate zero. In this case, the speed controls 602 and 618 may be actuated by pressing the buttons 523 and 524 to bring the shafts into synchronism and proper phase relation. Correct adjustment is indicated by a steady reading of zero on the dial 511.

*Automatic register for two or more objects under observation*

Figs. 7 to 10, inclusive, show an automatic register system for separating echo pulses from two or more objects and displaying an accurate reading on each by means of a separate dial.

Referring to the figures, a pulsing circuit 700 is connected to a radio transmitter 701 which is in turn connected to a transmitting antenna 702 associated with a transmitting reflector 703. The pulsing circuit 700 is also connected to a timing system comprising a start-stop tube 704, a trigger tube 705, and an automatic gate tube 706 which elements and associated circuits correspond to the system of Fig. 2 comprising the tubes 202, 205 and 208. A receiving reflector 707 is provided with a receiving antenna 708 connected to a radio receiver 709. The output of the radio receiver is connected to a tube 710 arranged like the flashing tube 212 in the system of Fig. 2 but which in this case does not directly flash the lamps but controls intermediate apparatus for this function.

The output of the tube 710 is connected to the input of a tube 711 in the output of which is a rectifier 712 connected back through a lead 713 to the grid circuit of the left-hand triode in tube 710. The output of the tube 710 is also connected, by a lead 722 to the input of a flashing tube 714 which is in turn connected to a flash lamp 715 arranged in position to illuminate a rotatable dial 716. The dial 716 is one of three shown mounted side by side behind separate windows in Fig. 10.

The tubes 710, 711 and 714 and their associated circuits, together with the flash lamp 715 and the scale 716 constitute one of a plurality of registry channels. Another such channel is shown in Fig. 8 comprising tubes 800, 801 and 804, a flash lamp 805 and a scale 806. The scale 806 and a third scale 808 are shown alongside the scale 716 in Fig. 10. Additional registry channels may be connected according to the scheme shown but for the sake of clarity in the drawings, only three scales are shown and two registry channels.

The internal connections in the channel shown in Fig. 8 are the same as in the first registry channel, Fig. 7, except that a connection like the lead 722 in Fig. 7 is omitted in Fig. 8 and instead a lead 717 connects the right-hand cathode of the tube 800 with the cathode circuit of the tube 711 in the first channel. A lead 802 corresponds to the lead 713. A lead 803 interconnects the second channel with the third channel, not shown, in the same way that the lead 717 interconnects the first and second channels.

The automatic gate tube 706 is connected by a lead 718 with the input circuit of each flashing tube of which the two shown are 714 and 804, a branch lead 719 going to the tube 714 and a branch 807 going to the tube 804.

The output of the radio receiver 709 is connected directly to the input of the tube 710 and also through a lead 720 with the input of the tube 800 and other tubes of similar function to tube 800, not shown.

In the operation of the system of Figs. 7 to 10, inclusive, the radio transmitting system and the tubes 704, 705 and 706 operate the same as the radio transmitting system and the tubes 202, 205 and 208, respectively in Fig. 2. The output of the radio receiver 709 is impressed upon the tubes 710, 800 and others of similar function each associated with one of the dials 716, 806, 808, etc. The tube 710 serves as a two-stage amplifier and will respond to amplify the first pulse which is received. The tube 711 is actuated by the pulse in the tube 710 to initiate a square wave which serves as a blanking pulse impressed upon the input of the first stage of the tube 710 through the lead 713. The diode 712 serves to provide the proper direct current bias for the application of the blanking pulse to the grid of tube 710. The duration of this blanking pulse is such that the tube 710 is disabled for an interval of a little less than the interval between pulses of the circuit 700 so that the amplifier 710 may be ready to receive a succeeding reflection from the same object. The blanking feature greatly reduces noise interference besides limiting the amplifier to reflections from a single object. It will be evident that as soon as a reflection passes through the amplifier 710 the blanking circuit takes control and excludes reflections from other objects at the same time cutting out random peaks due to noise.

The circuit of the tube 710 differs from that of the tube 800 and following tubes of similar function in having the lead 722 coupling the cathode circuits of the two portions. In the tube 800 the lead 722 is omitted and the cathode of the second half of the tube is connected through the lead 717 to the cathode circuit of the tube 711. When the tube 711 is operating due to the first channel registering a reflection, the point 723 in the cathode circuit of the tube 711, at which point the lead 717 is connected will be at a more negative potential than when the tube 711 is not operating. The potential of the point 723 is transferred to the right hand cathode 809 of the tube 800 by the lead 717, thereby bringing this cathode to an operating potential whenever the tube 711 is operating. When the tube 711 is not operating, the cathode 809 is at a non-operating potential, i. e., it is so positive with respect to its control grid that no electrons flow from it.

The lead 803 performs a function similar to that of the lead 717. Thus the right-hand cathode of the first tube in any channel, except the first channel, is biased beyond cut-off unless the preceding channel is operating on a reflection.

The first reflection received will find only the first channel operative and will take over the tube 710 and register on dial 716 in the first window. The mechanism of this response is by way of the connection of the output circuit of 710 to the input circuit of the tube 714, permitting the flashing circuit of the tube 714 to be energized and the tube 715 flashed when the dial 716 shows the correct reading for the first reflection. The next reflection to come in finds the tube 710 inoperative due to the blanking pulse from the rectifier 712 but is able to operate the tube 800. Operation of the tube 800 initiates a pulse in the tube 801 thereby placing a blanking pulse upon the tube 800 through the lead 802 and an enabling pulse on the following tube through the lead 803. The tube 800 also energizes the flashing tube 804 to flash the lamp 805 at the proper instant when the scale 806 indicates the correct range of the object from which the second reflection is received.

A third reflection finds tubes 710 and 800 both disabled by blanking pulses but is able to operate the third flashing circuit to give a reading on the dial 808. Other channels that may be added to the chain operate in similar manner. When a second reflection from the first object is received, the blanking pulse on the tube 710 will have ended and that tube will be ready to transmit an impulse to the flashing tube 714 as before.

What is claimed is:

1. A range measuring system comprising a slow timing circuit for generating a series of potentials varying cyclically at a relatively slow time rate, a fast timing circuit for generating a similar series of potentials varying cyclically at a relatively fast rate, means to transmit a pulse at the start of each cycle of said fast timing circuit, means to receive reflected pulses from a distant object, an indicator for exhibiting an indication varying cyclically in synchronism with the potential in said slow timing circuit, a lamp for illuminating said indicator, a flashing circuit for said lamp, means to match the potentials of said fast and slow timing circuits, means controlled by the matching of said potentials to sensitize said flashing circuit for a predetermined period once during each cycle of said fast timing circuit, and means actuated by said reflected pulses to operate said flashing circuit upon coincidence of the receipt of a reflected pulse with a period of sensitivity of said flashing circuit to illuminate said indicator to show an indication related to the time interval between the transmission of a pulse and the receipt of a reflected pulse.

2. A range measuring system comprising a slow timing circuit for generating a series of potentials varying cyclically at a relatively slow time rate, a range scale and an index therefor, means to vary the relative position of said index along said scale in cyclic manner once during each cycle of said slow timing circuit, a fast timing circuit for generating substantially the same series of potentials as in said slow timing circuit but varying cyclically at a relatively fast time rate, means to transmit pulses coincident with the start of the successive cycles of said fast timing circuit, means to receive reflected pulses from a distant object, a lamp for stroboscopically illuminating said scale and index, a flashing circuit for said lamp, means to match the potentials of said fast and slow timing circuits, means to sensitize said flashing circuit for a predetermined period following an occurrence of matched potentials once during each cycle of said fast timing circuit, and means actuated by said reflected pulses to operate said flashing circuit once per cycle of said slow timing circuit when a reflected pulse is received during the period of sensitivity of said flashing circuit whereby the said scale and index are illuminated to exhibit a substantially stationary reading of the range of the distant object.

3. A range measuring system comprising means to transmit a train of recurrent pulses, means to receive reflected pulses from a distant object, a fast timing circuit for generating a succession of potentials recurring cyclically at a relatively fast rate, each cycle commencing with the transmission of a pulse, said fast timing circuit serving to correlate the potential at each instant with the elapsed time since the transmission of a pulse, a slow timing circuit for generating substantially the same succession of potentials recurring cyclically at a relatively slow rate, a range scale and an index therefor, means to vary the relative position of said index along said scale in cyclic manner once during each cycle of said slow timing circuit, said scale and index serving to correlate each value of potential in said slow timing circuit with a range value for the distant object, a lamp for stroboscopically illuminating said scale and index, a flashing circuit for said lamp, means to compare the instantaneous potentials of said respective timing circuits, means to sensitize said flashing circuit for a predetermined period immediately following an occurrence of matched potentials, thereby sensitizing said flashing circuit once per cycle of said fast timing circuit when the elapsed time since the transmission of a pulse corresponds to the range value simultaneously indicated by said scale and index, and means to actuate said flashing circuit to flash said lamp when a reflected pulse is received during a period of sensitivity of said flashing circuit, thereby illuminating said scale and index when the time elapsed from the transmission of a pulse until the receipt of the reflected pulse corresponds to the range reading indicated by the scale and index at the instant of receipt of the said reflected pulse.

4. A range measuring system comprising means to transmit a train of recurrent pulses, means to receive reflected pulses from a distant object, means synchronized with the transmitted pulses to produce a wave of potential varying cyclically as a function of time at a relatively fast rate, the instantaneous value of the potential of said wave in any cycle representing the elapsed time since the beginning of the same cycle, means to indicate a succession of readings each representative of a value of elapsed time between the transmission of a pulse and the receipt of the corresponding reflected pulse, said readings varying cyclically as a function of time at a relatively slow rate, auxiliary means conditioned by coincidence of the instantaneous indicated reading with the instantaneous value of potential in the cyclically varying potential wave corresponding to the said indicated reading, and means actuated by said auxiliary means to illuminate said indicating means when the return of a reflected pulse substantially coincides with the correct reading on the indicating means.

5. A time measuring system for recurrent time intervals comprising means to signalize the respective beginnings of said intervals, means to signalize the respective endings of said intervals, means to generate potentials varying cyclically at a relatively fast rate, the instantaneous value of the potential representing the elapsed time since the beginning of the current interval, means to generate potentials varying cyclically at a relatively slow rate, the instantaneous values of which potentials represent time intervals of different lengths irrespective of the beginning of an interval to be measured, scale means giving an indication varying with the time interval instantaneously represented by the potential of said relatively slowly varying generating means, auxiliary means actuated by a coincidence of potentials bearing a certain relation to each other in said fast and said slowly varying generating means, and means actuated jointly by said auxiliary means and by the said means to signalize the end of said time intervals, whereby to indicate when the said scale means gives a true reading as determined by the length of the time interval being measured.

ALBERT M. SKELLETT.

REFERENCES CITED

The following references are of record in the file of this patent:

UNITED STATES PATENTS

| Number | Name | Date |
|---|---|---|
| 1,924,174 | Wolff | Aug. 29, 1933 |
| 2,075,140 | Schlesinger | Mar. 30, 1937 |
| 2,118,518 | Neumann | May 24, 1938 |
| 2,098,287 | Gent | Nov. 9, 1937 |
| 2,300,189 | Wolff | Oct. 27, 1942 |
| 1,102,234 | Bliss | July 7, 1914 |
| 1,933,650 | Bascom | Nov. 7, 1933 |
| 2,184,355 | Libman et al. | Dec. 26, 1939 |
| 2,369,659 | Carr | Feb. 20, 1945 |
| 2,189,549 | Hershberger | Feb. 6, 1940 |